INVENTOR
ERWIN L. SCHAUB
BY
ATTORNEY

INVENTOR
ERWIN L. SCHAUB
BY
ATTORNEY

United States Patent Office 3,581,355
Patented June 1, 1971

3,581,355
ANTI-BACKOUT WORM DRIVE CLAMP
Erwin L. Schaub, Plandome, N.Y., assignor to Ideal
Corporation, Brooklyn, N.Y.
Filed Nov. 20, 1969, Ser. No. 878,286
Int. Cl. B65d 63/00
U.S. Cl. 24—274    7 Claims

ABSTRACT OF THE DISCLOSURE

A worm drive bond clamp for hose or the like, made with a sheet metal housing having radial end walls formed with arched openings to seat front and rear journal portions of a worm screw fixed in the housing, has the screw formed with a thread root diameter and a rear journal diameter that fit the arch of the rear end wall opening, and with a circumferential ridge of greater diameter between the rear journal portion and the rearmost turn of the thread, so that the screw can be inserted by screwing its thread through the rear opening and forcing the ridge through space provided at the base of that openings by elastic upward deflection of the rear end wall, whereupon the ridge abuts the inner side of the rear end wall to prevent the screw from being screwed backwardly out of the housing. The screw is formed by rolling a headed metal screw blank between thread forming dies having journal forming dies fixed along their opposite side edges, without need for any turning or shaving operation.

This invention relates to a "worm drive" clamp for hose or other compressible tubing, of the type having a worm screw fitted rotatably in a housing fixed to one end of a clamp band with the screw thread engageable into slots formed in the other end of the band for moving the slotted end through the housing.

In commonly used worm drive clamps, the housing comprises a hemi-cylindrical sheet metal body having radially inturned end walls formed with arched central openings to constitute front and rear bearings for the screw. The screw has a threaded cylindrical body portion located between front and rear journal portions formed as the bottoms of annular grooves cut, respectively, in a rounded screw tip and in a backward region of the screw between its head and its thread. The grooves are cut by shaving into a headed screw blank. After the housing is fixed to the band, the screw is inserted by screwing its thread through the rear bearing opening until the rounded tip elastically spreads the front bearing opening and passes therethrough, whereupon the edges of the end wall openings engage into the grooves to hold the screw in working position. Abutment of the forward wall of the tip groove against the front end wall of the housing prevents the screw from being backed out of the housing by engagement of its thread in the rear wall opening when the screw is turned in reverse direction to open the clamp band.

The cutting of the bearing grooves required in the screws of such clamps is a costly part of the process of their manufacture.

Other types of worm drive clamps are known, in which a worm screw is prevented from backing out of a housing without resort to cut bearing grooves, but the known clamps of that nature lack the screw insertion capacity or other functions of the usual clamps above mentioned.

A primary purpose of the present invention is to provide an improved construction of worm drive clamps of the usual type, including a new form of worm screw therefor and a method of making the screw, by virtue of which, although the housing and screw continue to have the structures whereby the screw is inserted by being screwed through the rear wall opening of the housing, a grooved screw tip straddling the front end wall of the housing is no longer needed to prevent the screw from being backed out of the housing by reverse rotation.

A further object of the invention is to provide a worm screw for such a clamp and a method of making it whereby all shaving of bearing grooves can be eliminated, with very considerable savings of clamp manufacturing costs yet without any loss of functions beneficial to the assembling or the use of the clamps.

According to the invention, the clamp is made with housing and band structures usual for the above mentioned worm drive clamps, while the screw is made not only with a substantially cylindrical worm thread and with journal portions in front and to the rear of the thread but also with a circumferential barrier ridge which is formed thereon between the rear journal portion and the rearmost turn of the thread. The rear journal portion is made to a diameter approximately the same as the root diameter of the thread, so that each of these diameters will fit in and through the arched opening in the rear end wall of the housing during insertion of the screw into the housing, while the ridge is made larger in diameter than the rear wall opening, yet not so large but that it can be forced through it by an elastic spreading of the rear end wall, so that when the screw in the housing is turned backward to open the clamp band the ridge will abut against the inner side of the rear end wall and prevent the thread from becoming engaged in said opening. Thus, the clamp here provided enables elimination of the cut-in grooves and related shaving operations required for the screw of the usual worm drive clamps without loss of any of the beneficial functions of such clamps.

The circumferential barrier ridge is made with a diameter considerably smaller than that of the worm thread. Its diameter ordinarily is approximately .03 to .05 inch greater than the diameter of the rear journal portion. It preferably is formed in adjoining relation to the backward end of the worm thread, but if desired the ridge may be spaced a small distance rearwardly from the thread end.

According to another feature of the invention, the worm screw is given the required thread and ridge formations in quite a quick and economical manner by simply rolling the threadable stem, or blank portion, of a headed metal screw blank along and under compression between confronting ribbed faces of elongate thread forming dies with the blank positioned between the dies for incomplete run-out of the thread formed. In this way, peripheral metal of the blank portion is deformed into a worm thread and a circumferential ridge of suitable diameter is left on the workpiece at the backward end of the thread.

Moreover, the worm thread, ridge and journal portions can all be formed in a single operation by rolling a suitable headed blank between threading dies that have coacting journal forming dies fixed to and along their respective opposite sides edges.

The foregoing and other objects, features and advantages of the invention will be further apparent from the following detailed description of illustrative embodiments thereof, reference being made to the accompanying drawing wherein.

Figure 1:
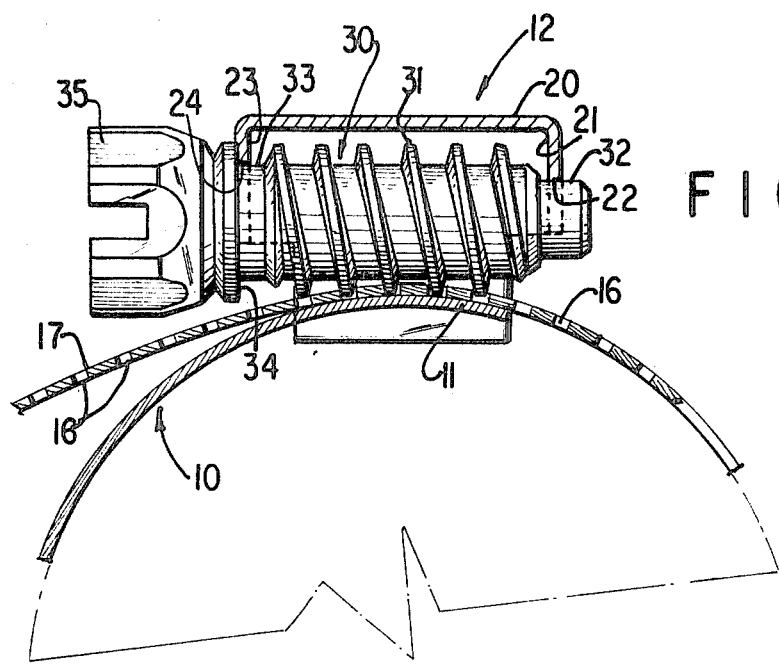
FIG. 1 is a side elevational view, partly in section, of a worm drive clamp embodying the invention in a preferred form.

Referring now to FIG. 1, the worm drive clamp shown includes a metal band 10 for circumferential engagement about a hose or other compressible tubing, with a housing 12 of commonly used form fixed to one end 11 of the band. A worm screw 30 fitting rotatably in the housing has a worm thread 31 formed on a substantially cylindrical body portion of the screw inside the housing. The thread 31 engages with slots 16 formed in and spaced apart along the other end 17 of the band, so that turning movement of the screw in the housing will displace the band end 17 therethrough in the direction required for either contracting or loosening the clamp on the tubing.

The housing 12 has a hemi-cylindrical body 20 of formed sheet metal and radially inturned front and rear end walls 21 and 23. These end walls form arched central openings 22 and 24, respectively, the edges of which constitute bearing seats fitting upon journal portions 32 and 33 formed on the screw in front and to the rear of the thread 31. The edge of the rear end wall opening 24 will also fit between turns of the thread 31, thus enabling insertion of the screw into the housing by a forward screwing of its thread through opening 24.

Each of the journal portions 32 and 33 is a substantially straight cylindrical extension from the threaded body portion of the screw. The rear journal 33 joins with the thrust-sustaining flange 34 of a drivable head 35 formed on the back end of the screw, and has nearly the same diameter as the root of the thread 31. Accordingly, that limited width of the rear wall opening 24 which just enables the thread 31 to be screwed into the housing upon the edge of opening 24 serves also to provide a close seat for journal portion 33 when the screw is in place.

Figure 2:
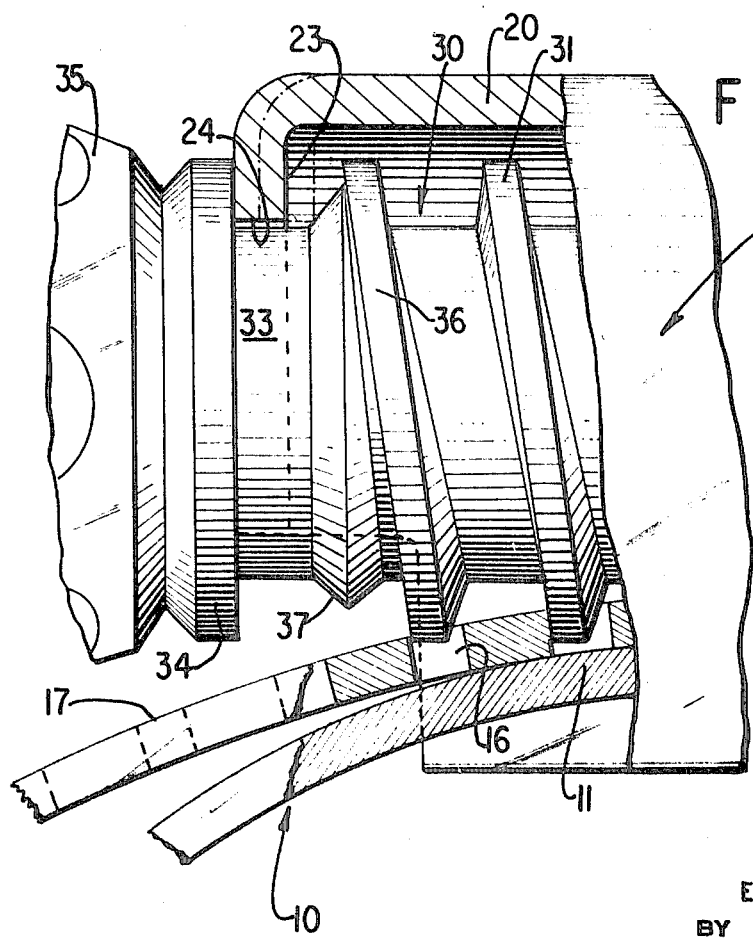
FIG. 2 is an enlarged view of a backward portion of the worm screw of the clamp of FIG. 1.

As readily seen in FIG. 2, the thread 31 extends in spiral form about and along its root to a backward thread end 36 which adjoins a ridge 37 that encircles the screw body between the rear journal portion 33 and the rearmost turn of the thread. This circumferential ridge, or rib, is larger in diameter than the rear wall opening 24 and the rear journal portion 33, so that it will abut against the inner side of rear end wall 23 to prevent the backward end of thread 31 from becoming engaged in opening 24 by backward turning of the screw in the housing, yet it is sufficiently smaller in diameter than the thread that it is forceable through the space at the base of and below opening 24, by itself elastically deflecting the wall 23 upwardly relative to the bottom of the housing and thus entering the housing to complete the insertion of the screw thereinto, when the threaded portion has been screwed through the rear opening.

Ordinarily, the diameter of the ridge 37 is made approximately .03 to .05 inch greater than the diameter of the rear journal portion 33. A typical worm screw of the improved clamp has, for example, a thread diameter of about .35", a thread spacing of about .10", a thread root diameter of about .25", a rear trunnion diameter of about .25", and a circumferential ridge 37 of about .29" in diameter; and it is fixed in a housing having a U-shaped rear end wall opening 24 of about .25" in width formed with an arch radius of about .12" and an edge thickness of about .03".

Figure 3A:
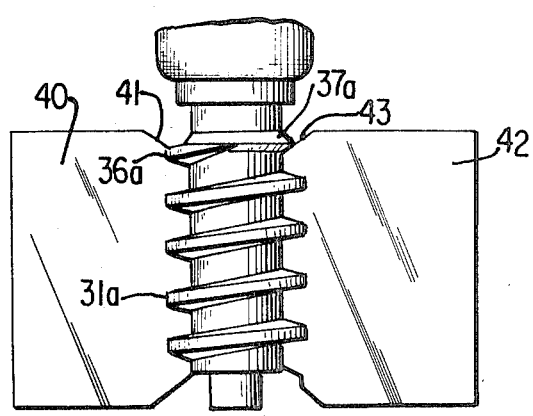
FIG. 3a shows the end point of a screw forming operation, as applied to a screw blank of the form shown in FIG. 3b.
Figure 3B:
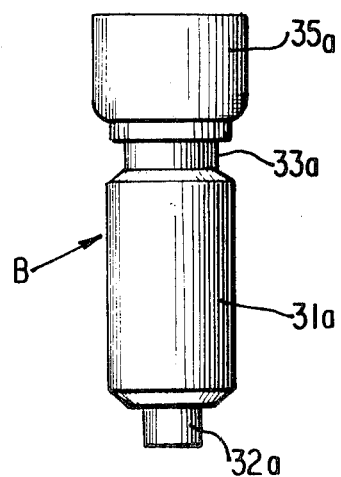

A method of making a worm screw of the character described is illustrated in FIG. 3a and FIG. 3b. The screw blank B shown in FIG. 3b is made from a piece of suitable metal wire, or rod, stock having, for example, a diameter of about .282", by heading and milling, turning (shaving) or roll forming the piece to give it a driving head 35a and front and rear journal portions 32a and 33a separated by a straight cylindrical blank portion 31a. FIG. 3a shows a cross-section of conventional elongate thread forming dies 40 and 42 at a point of their relative travel, one over and along the other in confronting relationship, where the peripheral metal of the blank portion 31a has been substantially completely deformed into the required worm thread 31a and barrier ridge 37a by being rolled under compression between approximately ribbed faces of the two dies.

The blank B is brought from the form shown in FIG. 3b into the form shown in FIG. 3a by being positioned and rolled between the dies 40 and 41 so that there will be an incomplete runout of the thread formed. That is, as seen in FIG. 3a, the blank is placed and held too high between the dies for the backward, or uppermost, part of the blank portion to be deformed into a part of the worm thread. Then, as the rolling compression and deformation of the blank portion takes place, the part not deformed by the ribbed die faces remains along the chamfers 41 and 43 of the dies in the form of a circumferential rib 37a adjoining the backward end 36a of the worm thread formed between the dies.

Figure 4:
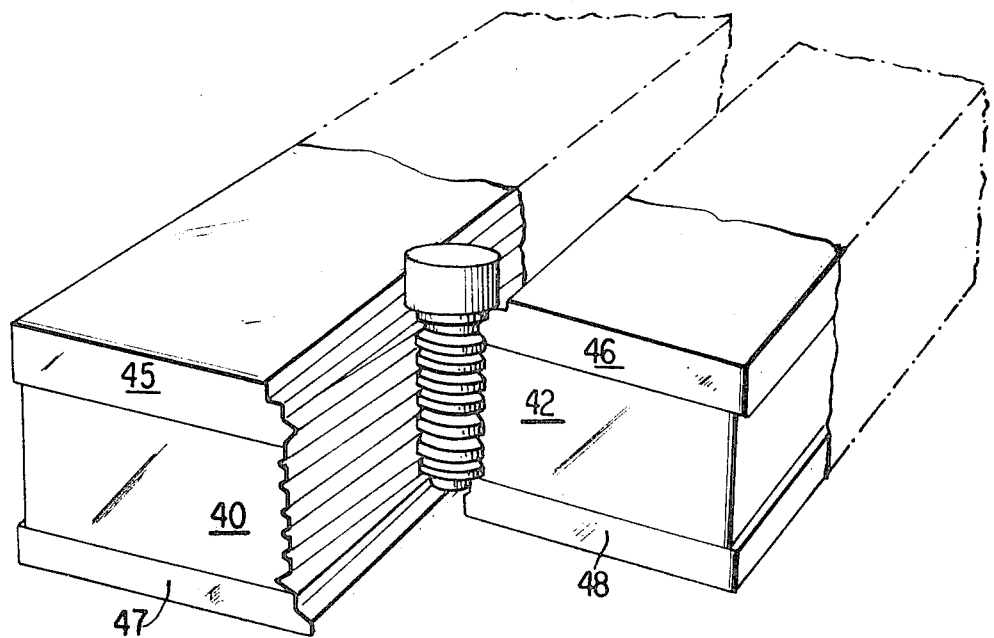
FIG. 4 is a schematic view showing the screw of the clamp of FIG. 1 as it leaves an assembly of elongate dies between which it is formed from a headed screw blank.

A further development of the above method is illustrated in FIG. 4, by which a merely pre-headed metal screw blank, not subjected to any previous milling, shaving or roll forming operation, is formed in a single die rolling operation into the finished worm screw of the clamp shown in FIG. 1. In this development, the blank is rolled under compression between the confronting ribbed faces of elongate thread forming dies 40 and 42, like those of FIG. 3a, which have coacting journal forming dies 45, 46 and 47, 48 fixed to and along their respective opposite side edges. Thus, while the worm thread 31 is being formed by the ribs of the threading dies 40 and 42, the rear journal portion 33 is formed by the opposing faces of side dies 45 and 46, the ridge 37 is formed between chamfers of those side dies and chamfers 41 and 43 of the threading dies, and the front trunnion portion 32 is formed by the opposing faces of side dies 47 and 48.

The embodiments of the invention herein set forth are illustrative and may be changed or modified in various ways without departing from the substance of the invention which is intended to be defined by the appended claims.

What is claimed is:

1. In a worm drive clamp including a housing having a bottom secured to one end of a clamp band and a worm screw fitting rotatably in said housing, said screw having a threaded cylindrical body portion and journal portions in front and to the rear thereof, the other end of said band having slots formed therein and spaced apart therealong for engagement by the thread of said screw so that rotation of said screw will displace said other end longitudinally relative to said housing, said housing having front and rear end walls radial to said journal portions and respectively formed with arched openings the edge of which constitute bearing seats for said journal portions, and the edge of said rear wall opening fitting between turns of said thread to enable insertion of said threaded portion into said housing by forward screwing of said thread through said opening, a worm screw as aforesaid having a circumferential ridge formed thereon between the rear journal portion thereof and the rearmost turn of said thread, the diameter of said rear journal portion being approximately the same as the root diameter of said thread, said ridge being larger in diameter than said rear wall opening so that it will abut the inner side of said rear wall to prevent the backward end of said thread from becoming engaged in said opening by backward turning of said screw in said housing, yet being sufficiently smaller in diameter than said thread that it is forceable through space at the base of said rear wall opening, by itself elastically deflecting said rear wall upwardly relative to the bottom of said housing, and thus entering the housing, when said thread has been screwed through said rear opening.

2. A worm screw of a clamp according to claim 1, the diameter of said ridge being approximately .03 to .05 inch greater than the diameter of said rear journal portion.

3. A worm screw of a clamp according to claim 1, said ridge adjoining the backward end of said thread.

4. A worm screw of a clamp according to claim 1, said thread and said ridge being deformations rolled into the blank portion of a headed metal screw blank by oppositely facing elongate thread forming dies with the blank positioned between the dies for incomplete runout of the backward end of the thread formed.

5. A worm screw of a clamp according to claim 1, said thread, said ridge and said journal portions being deformations rolled into the blank portion of a headed metal screw blank by and between oppositely facing elongate thread forming dies having coacting journal forming dies fixed to and along their respective opposite side edges.

6. A method of making a worm screw of a clamp according to claim 1, which comprises rolling the blank portion of a headed metal screw blank along and under compression between confronting ribbed faces of elongate thread forming dies with the blank positioned therebetween for incomplete runout of the backward end of the thread formed, thereby deforming peripheral metal of said blank portion into a worm thread and leaving a circumferential ridge as aforesaid adjoining the backward end of said thread.

7. A method of making a worm screw of a clamp according to claim 1, which comprises rolling the blank portion of a headed metal screw blank along and under compression between confronting ribbed faces of elongate thread forming dies having coacting journal forming dies fixed to and along their respective opposite side edges, thereby deforming the peripheral metal of said blank portion into a worm thread, a circumferentail ridge and journal portions as aforesaid with said ridge adjoining the backward end of said thread.

References Cited

UNITED STATES PATENTS

| | | | |
|---|---|---|---|
| 2,395,273 | 2/1946 | Hill et al. | 24—274 |
| 2,314,390 | 3/1943 | De Vellier | 10—10X |
| 2,990,599 | 7/1961 | Gustavsson | 24—274 |
| 3,028,650 | 4/1962 | Tinsley | 24—274 |

DONALD A. GRIFFIN, Primary Examiner

U.S. Cl. X.R.

10—10; 74—458